US006963684B2

(12) United States Patent (10) Patent No.: US 6,963,684 B2
Bhardwaj et al. (45) Date of Patent: Nov. 8, 2005

(54) MULTI-BAND ARRAYED WAVEGUIDE GRATING WITH IMPROVED INSERTION LOSS AND WAVELENGTH ACCURACY

(75) Inventors: Jyoti Bhardwaj, Cupertino, CA (US); David Dougherty, Moutain View, CA (US); Venkatesan Murali, San Jose, CA (US); Hiroaki Yamada, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/099,565

(22) Filed: Mar. 15, 2002

(65) Prior Publication Data

US 2003/0174949 A1 Sep. 18, 2003

(51) Int. Cl.[7] .............................. G02B 6/34; G02B 6/26
(52) U.S. Cl. ........................... 385/37; 385/15; 385/27; 398/43; 398/84; 398/87; 398/79
(58) Field of Search .............................. 398/43, 82, 84, 398/87, 65, 48–51, 79; 385/14, 24, 37, 15, 385/27

(56) References Cited

U.S. PATENT DOCUMENTS 6,208,444 B1 * 3/2001 Wong et al. .................... 398/9
2002/0150329 A1 * 10/2002 Ahn et al. ..................... 385/24

OTHER PUBLICATIONS

"VLSI Technology", Second Edition, 1988, pp. 258-269, no date.
John Canning, "Birefringence control in planar waveguides using doped top layers", Optics Communications, May 8, 2001, pp. 225-228.

Christoph K. Nadler et al., "Polarization Insensitive, Low-Loss, Low-Crosstalk Wavelength Multiplexer Modules", IEEE Journal of Selected Topics In Quantum Electronics, vol. 5, No. 5, Sep./Oct. 1999, pp. 1407-1412.
A Kilian et al., "Birefringence Free Planar Optical Waveguide Made by Flame Hydrolysis Deposition (FDH) Through Tailoring of the Overcladding", Journal of Lightwave Technology, vol. 18, No. 2, Feb. 2000, pp. 193-198.
S.M. Ojha, "Simple Method of Fabricating Polarisation-Insensitive and Very Low Crosstalk AWG Grating Devices", Electronics Letters, vol. 34, No. 1, Jan. 8, 1998, pp. 78-79.
Y. Hida, "400-channel 25-GHz spacing arrayed-waveguide grating covering a full range of C- and L-bands", Optical Fiber Communication Conference and Exhibit, 2001, OFC 2001, vol. 3, pp. wb2-1-wb2-3.

(Continued)

Primary Examiner—Akm Enayet Ullah
Assistant Examiner—Kevin S. Wood
(74) Attorney, Agent, or Firm—Allen, Dyer, Doppelt, Milbrath & Gilchrist, P.A.

(57) ABSTRACT

A planar lightwave circuit generalized for handling any given band of multiple bands of a wavelength range, including a first grating element handling a first group of bands; and a second grating element handling a second group of bands. The first and second groups of bands overlap in the wavelength range, and may be spaced apart by a fixed wavelength value. By providing two periodic grating elements handling alternating bands, their free spectral range is allowed to expand, improving their roll-off characteristics. By providing separate inputs for each band, wavelength accuracy can be improved. Device flexibility can be further improved by using switch and interleaver fabrics at the inputs and outputs. The resultant device, generalized to handle any given band within a wavelength range, eliminates the need for separate component design and inventory tracking otherwise necessary.

9 Claims, 10 Drawing Sheets

OTHER PUBLICATIONS

Jane Lam et al., "Design Trade-offs for Arrayed Waveguide Grating DWDM MUX/DEMUX", Lightwave Microsystems White paper, at least as early as Jan., 2001, 9 pages.

H. Takahashi et al., "Arrayed-Waveguide Grating for Wavelength Division Multi/Demultiplexer with Nanometre Resolution", Electronics Letters, Jan. 18, 1990, vol. 26, No. 2, pp. 87-88.

Meint K. Smit et al., "PHASAR-Based WDM-Devices: Principles, Design and Applications", IEEE Journal of Selected Topics in Quantum Electronics, vol. 2, No. 2, Jun. 1996, pp. 236-250.

Akira Himeno et al., "Silica-Based Planar Lightwave Circuits", IEEE Journal of Selected Topics in Quantum Electronics, vol. 4, No. 6, Nov./Dec. 1998, pp. 913-924.

C. Dragone, An N x N Optical Multiplexer Using a Planar Arrangement of Two Star Couplers, IEEE Photonics Technology Letters, vol. 3, No. 9, Sep. 1991, pp. 812-815.

Akimasa Kaneko et al., "Recent Progress on Arrayed Waveguide Gratings for DWDM Applications", IEICE Tran Electron., vol. E83-C, No. 6, Jun. 2000, pp. 860-868.

Wenjie Chen et al., "Understanding the Principles of Thermal-Optic Switching", Lightwave Microsystems White Paper, at least as early as Jan., 2001, 3 pages.

Bob Shine et al., "Interleavers Make High-Channel-Count Systems Economical", Lightwave Magazine Report, Aug. 2000, 7 pages.

Thomas E. Murphy et al., "Wavelength- and Polarization-Insnesitive Integrated Directional Couplers", Integrated Photonics Research Conference, Jul. 20, 1999, 12 pages.

Thomas E. Murphy et al., "Wavelength- and Polarization Insensitive Integrated Directional Couplers Using Mach-Zehnder Structures", Research Laboratory of Electronics, MTI, pp. 1-3.

M.D. Feuer, "Upgradeable metro networks using frequency-cyclic optical add/drop", Optical Society of America, 2000, 3 pages.

Masahide Miyachi et al., "A Novel Optical Add/Drop Multiplexer Utilizing Free Spectral Range Periodicity of Arrayed Waveguide Grating Multiplexer", IEICE Trans. Electron., vol. E84-C, No. 5, May 2001, pp. 579-584.

* cited by examiner

MULTI-BAND ARRAYED WAVEGUIDE GRATING WITH IMPROVED INSERTION LOSS AND WAVELENGTH ACCURACY

CROSS-REFERENCE TO RELATED APPLICATIONS

This Application relates to the following copending, commonly assigned U.S. patent applications, each of which is incorporated by reference herein in its entirety:

Ser. No. 09/901,474 entitled "Redundant Package for Optical Components" filed Jul. 9, 2001;

Ser. No. 09/977,065 entitled "Waveguide Stress Engineering and Compatible Passivation in Planar Lightwave Circuits" filed Oct. 12, 2001;

Ser. No. 10/010,931 entitled "High Thermal Efficiency, Small Form-Factor Packages Including Thermally Insulative Cavities, and Transfer Molded Variants" filed Nov. 20, 2001;

Ser. No. 10/001,266 entitled "Precision Fiber Optic Alignment and Attachment Apparatus" filed Nov. 30, 2001; and Ser. No. 10/077,581 entitled "Compact, Low Insertion Loss, High Yield Arrayed Waveguide Grating" filed Feb. 15, 2002.

FIELD OF THE INVENTION

The present invention relates to planar lightwave circuits. More particularly, the present invention relates to improved arrayed waveguide grating (AWG) devices for multi-band wavelength filtering and processing in optical communication systems.

BACKGROUND OF THE INVENTION

Fiber optic communication systems offer far greater capacity than their electrical counterparts (e.g., twisted pair, or coaxial cable) and are therefore attracting much attention as the number and complexity of bandwidth-intensive applications increase. This ever-increasing need for bandwidth that only fiber can deliver is resulting in the continued, widespread deployment of fiber networks.

Legacy fiber systems have for many years existed primarily as untapped, long-haul, point-to-point links between "central offices." But simple market forces are pushing fiber networks beyond central offices and into the more architecturally diverse terrain of "metro" markets.

In existing systems, a single wavelength band carrying a single modulated data stream is transmitted across a single fiber link. Digital time division multiplexing (TDM) of the data stream can be used to accommodate separate, independent data channels over the same wavelength band, but these systems require expensive up/down-conversion of the optical signal to an electrical version for multiplexing/demultiplexing the separate channels. While providing some level of operational channelization, TDM techniques generally do not increase the overall data capacity of a single wavelength link.

Dense wavelength division multiplexing (DWDM) enables the transmission of multiple, independent wavelength channels across a single fiber, thus providing some channelization and a much greater data capacity. Predictably, this capability has resulted in the requirement to add or drop these wavelength channels along the previously untapped lengths of fiber to provide access to the individual wavelength channels. Optical add/drop multiplexers (OADMs) are employed for this function, enabled by arrayed waveguide grating (AWG) demultiplexers for filtering and forwarding individual wavelengths from a multiplexed stream; or AWG multiplexers for combining multiple, individual wavelengths into a multiplexed stream.

AWGs are in the class of "integrated" wafer-based optical components, called planar lightwave circuits (PLCs). AWGs can be useful in many optical communication applications where wavelength-specific filtering and processing are required. Unlike the legacy TDM systems, AWGs function purely in the optical domain when filtering the independent wavelength bands and thus do not require expensive, electrical up/down conversion. As all-optical wavelength filtering components, AWGs have become attractive for optical communication systems.

For example, with reference to the functional schematic of FIG. 1a, a conventional demultiplexer 10 has a single multiplexed input optical signal 12 including channels centered at wavelengths $\lambda_{1\text{-}40}$ (e.g., 100 GHz spacing and 25 GHz pass bands for one known communication system). Individual demultiplexed channels centered at respective wavelengths $\lambda_1 \ldots \lambda_{40}$ are outputs of this demultiplexer, each on its own respective output port 14.

FIG. 1b depicts an exemplary AWG embodiment of demultiplexer 10. The AWG includes an array of closely spaced array waveguides 22 having carefully controlled, differing path lengths which cause constructive phase interference patterns on the optical signals transmitted into the device. As discussed above, this technique is useful for multiplexing or demultiplexing optical signals transmitted from the array input waveguides 24—distributed by planar waveguide region 25 to array waveguides 22—then refocused through the output planar waveguide region 27 to output waveguides 26.

For a 40–48 channel device with 100 GHz spacing, a free spectral range of 6400 GHz is preferable (i.e., 64 total channels to remove the effects of outer channel rolloff). However, the channel plan of certain communication systems of interest may offer opportunities to reduce the bandwidth of each mux/demux. For example, with reference to the channel spectrum of FIG. 2, 40 total channels are shown, each at its own respective wavelength $\lambda_1 \ldots \lambda_{40}$. However, along certain communication paths, this channel plan can be broken into bands. Exemplary separation of this channel plan into five bands, each having 8 channels, is shown. Filtering may only be required within, but not outside, each band, thus reducing the required component bandwidth in these paths.

FIG. 3 depicts one exemplary approach to banded operation, i.e., separate demultiplexers $30_1 \ldots 30_5$ specially designed for each band of interest. This approach, while offering good intra-band performance of each component (due to their narrower bandwidths), requires five separate components, adding to inventory cost and complexity.

Other types of OADM components, for example those based on thin film filters, suffer a similar disadvantage: each filter is designed for a specific wavelength and therefore separate components are needed for each band.

The requirement of separate components for each band has non-trivial implications. Separate sets of technical specifications are required, as are separate procurement channels and inventory requirements.

What is required, therefore, are improved component design and packaging techniques which capitalize on banded operation but which do not require the conventional, separate technical and procurement specifications.

SUMMARY OF THE INVENTION

These requirements are met, and further advantages are provided, by the present invention which in one aspect is a planar lightwave circuit (and methods for its fabrication and use) generalized for handling any given band of multiple bands of a wavelength range, including a first grating element handling a first group of bands; and a second grating element handling a second group of bands.

The first and second groups of bands overlap in the wavelength range, and may be spaced apart by a fixed wavelength value. The fixed wavelength value is equivalent to the bandwidth of each band of the multiple bands, wherein the first group of bands comprises alternating, even bands of multiple bands of the wavelength range, and the second group of bands comprises alternating, odd bands of said multiple bands of the wavelength range.

The planar lightwave circuit may comprise separate inputs and outputs for each band, routed to the appropriate grating element; or common inputs and/or outputs for each group of bands, selectable to/from the appropriate grating element via controllable optical switch elements; or common inputs and/or outputs for each group of bands, routed to/from the appropriate grating element via an optical interleaver.

By providing two periodic grating elements handling alternating bands, their free spectral range is allowed to expand, improving their roll-off characteristics. By providing separate inputs for each band, wavelength accuracy can be improved. Device flexibility can be further improved by using switch and interleaver fabrics at the inputs and outputs. The resultant device, generalized to handle any given band within a wavelength range, eliminates the need for separate component design and inventory tracking otherwise necessary.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which:

FIG. 1b is a top plan view of an arrayed waveguide grating (AWG) implementation of the multiplexer of FIG. 1a;

FIG. 6b is a top plan view of a pair of AWGs on a common substrate implementing the demultiplexer of FIG. 6a;

BEST MODE FOR CARRYING OUT THE INVENTION

In accordance with the present invention, the periodic response of an AWG with a constrained free spectral range (FSR) is advantageously employed to use the same AWG to operate over more than one wavelength band of interest.

Figure 1A:
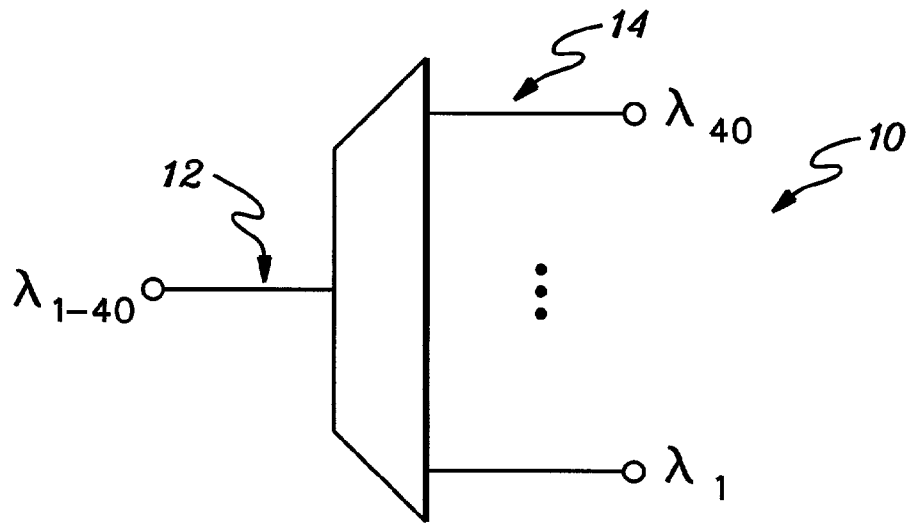
FIG. 1a is a functional schematic of a conventional 40 channel optical demultiplexer.
Figure 1B:
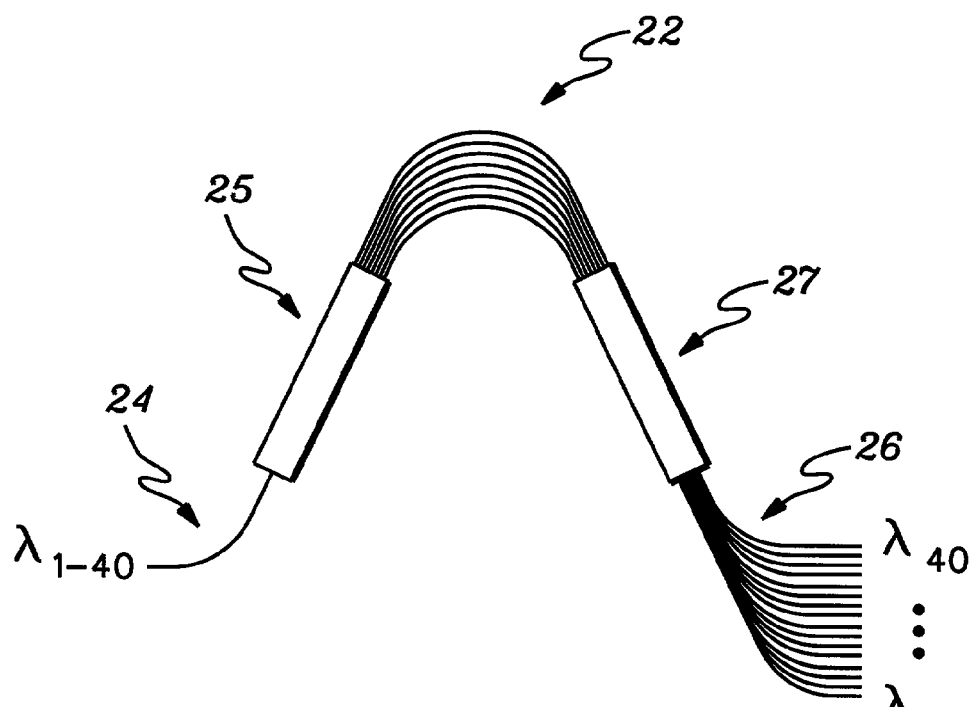

The FSR is modified in an AWG by changing the path length differences in the array waveguides 22 (FIG. 1b). The present invention extends to any type of AWG, including those described in the above-incorporated U.S. Patent Application entitled "Compact, Low Insertion Loss, High Yield Arrayed Waveguide Grating."

Figure 2:
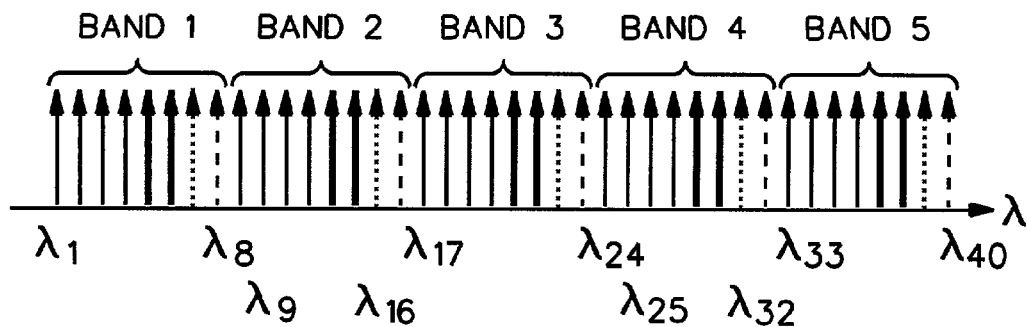
FIG. 2 is a spectral plot of a 40 wavelength band of optical communications (e.g., the "C" band), divided into 5 exemplary bands.
Figure 3:
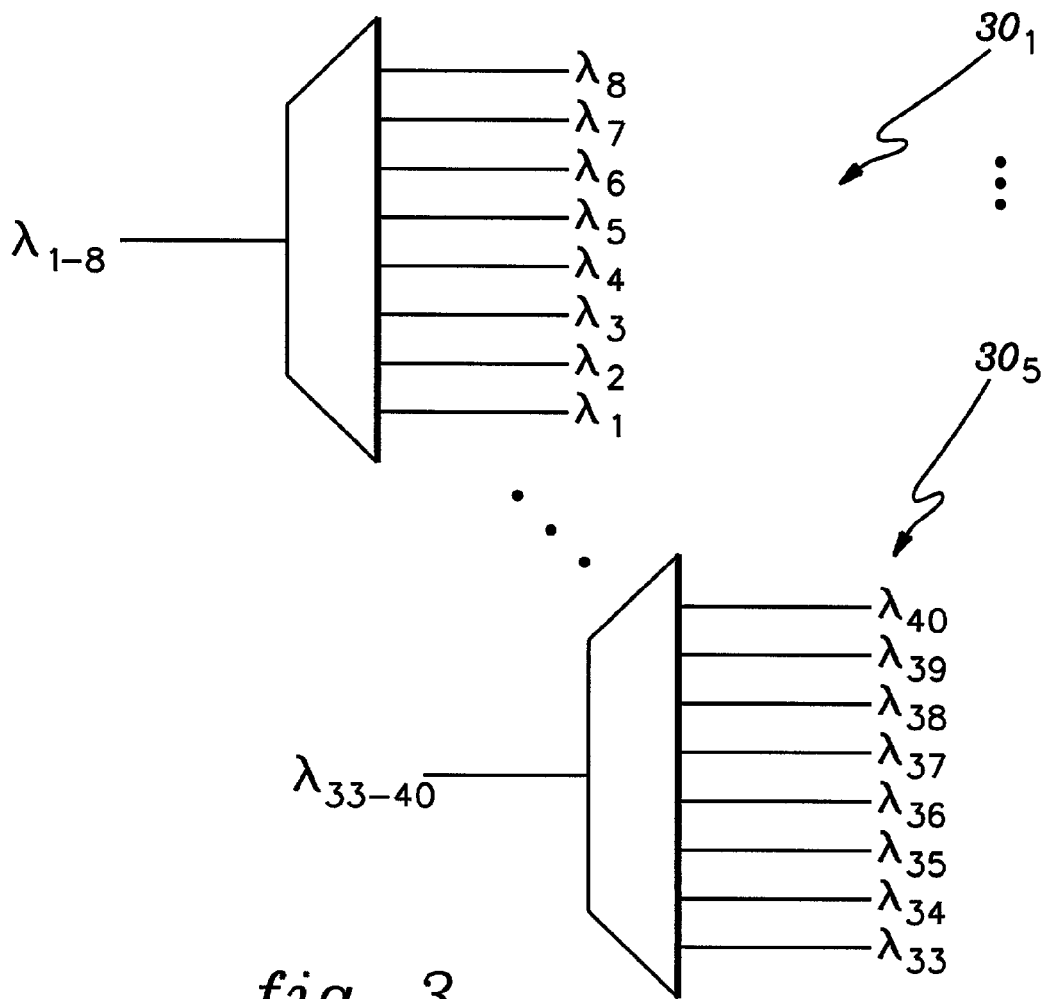
FIG. 3 shows 5 separate demultiplexers conventionally required, each with its own specifications, for the 5 bands of FIG. 2.

In one embodiment, the FSR is narrowed for a single AWG to 8 channels, corresponding to one of the 5 bands shown in FIG. 2. A single AWG can then be used for any of the 5 bands shown, since its response is periodic (period=8 channels or one band) across the entire 40 wavelength range. This is represented in FIG. 2 by the differing arrow types within each band; but similar across bands. If operated across the entire band, the same wavelength position in each band would appear at the same AWG output. For example, the firs t wavelength in each band would appear at the same AWG output. However, since an underlying assumption is that the AWG need only handle one of the 5 bands during operation, there will be no input wavelengths outside of this designated band and therefore no interfering signals at the outputs.

One significant benefit of this approach is that the same AWG design (and therefore the same part number, procurement specifications, etc.) can be used regardless of target band, since the AWG operates acceptably regardless of which input target band is used. This significantly simplifies design and procurement, and offers an advantage over any other approaches requiring a different design depending on target band (e.g., thin film filter approaches, which include filters built for specific wavelengths).

Figure 4:
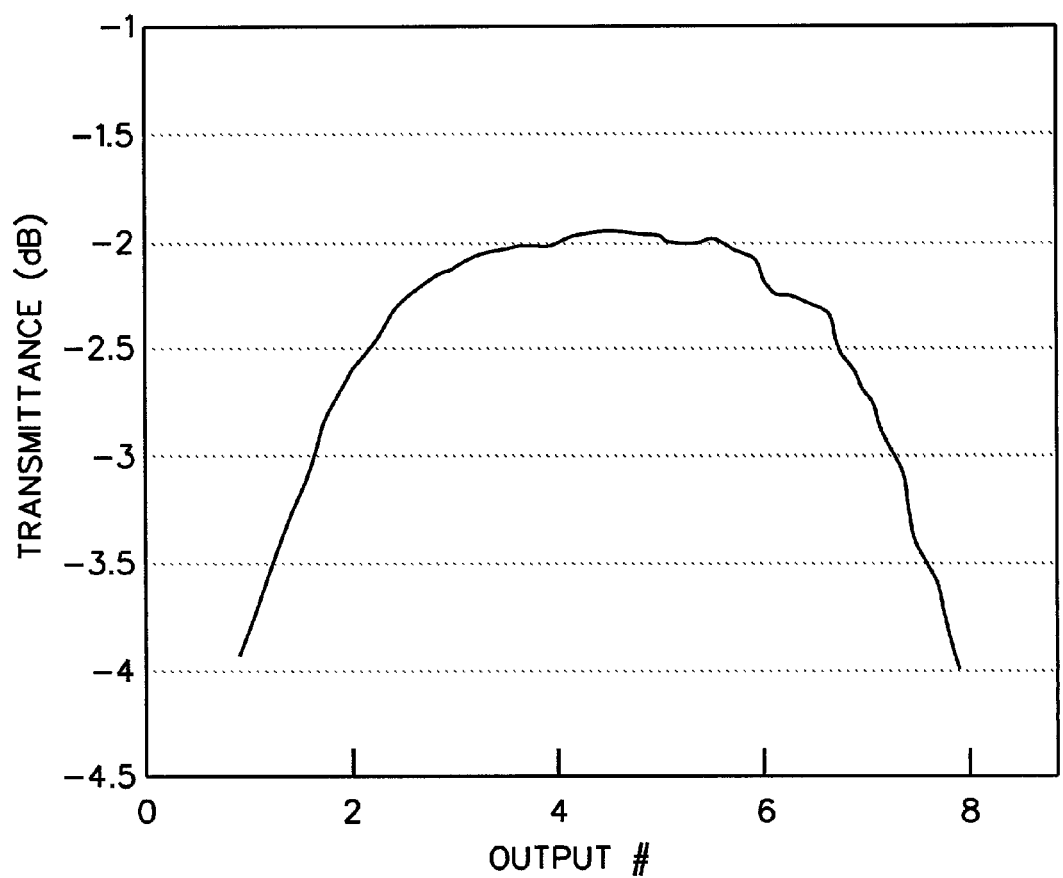
FIG. 4 is a graph showing the potential signal rolloff using a periodic AWG with a free spectral range (FSR) equal to the bands of interest (e.g., 8 channels)

There are some practical constraints on narrowing the FSR to the bands shown in FIG. 2. Inherent in any band-narrowing is the roll-off (i.e., increase in insertion loss) in the outer channels. The graph of FIG. 4 shows exemplary roll-off of approximately 2 dB from the inner channels to the outer channels of one 8 channel wavelength band, which in some applications is undesirable. However, the contiguous channel structure previously defined in many systems (such as the 40 channel contiguous system of FIG. 2) does not allow for any buffer space between the bands, therefore, this roll-off is a necessary result of narrowing the FSR to the required value.

Figure 5A:
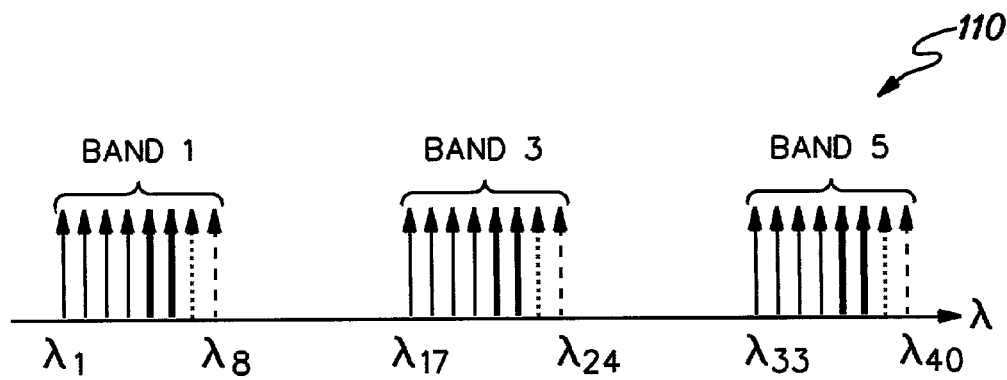
FIGS. 5a–b are spectral plots of the entire band of FIG. 2 divided into two groups of alternate bands, each group to be separately handled by one AWG of a pair of periodic AWGs of the present invention.
Figure 5B:
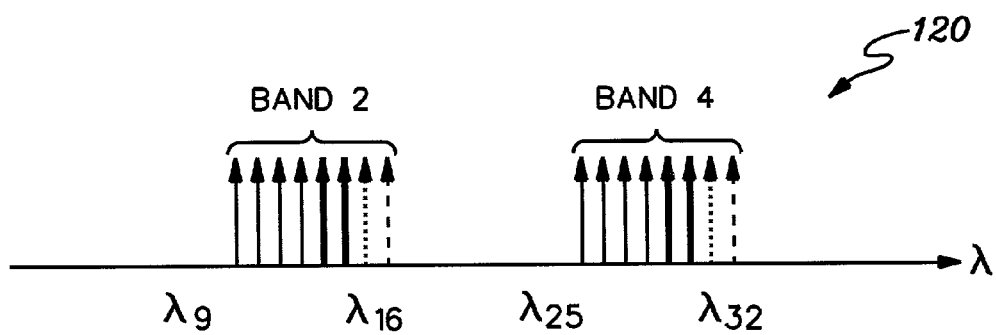

In accordance with another aspect of the present invention, the wavelength range of FIG. 2 is divided into at least two groups of alternating bands, each group to be handled by its own AWG with looser tolerances on its narrowed free spectral range. For example, and with reference to FIGS. 5a–b, group 110 (FIG. 5a) includes the odd bands 1, 3 and 5; and group 120 (FIG. 5b) includes the even bands 2 and 4.

Figure 6A:
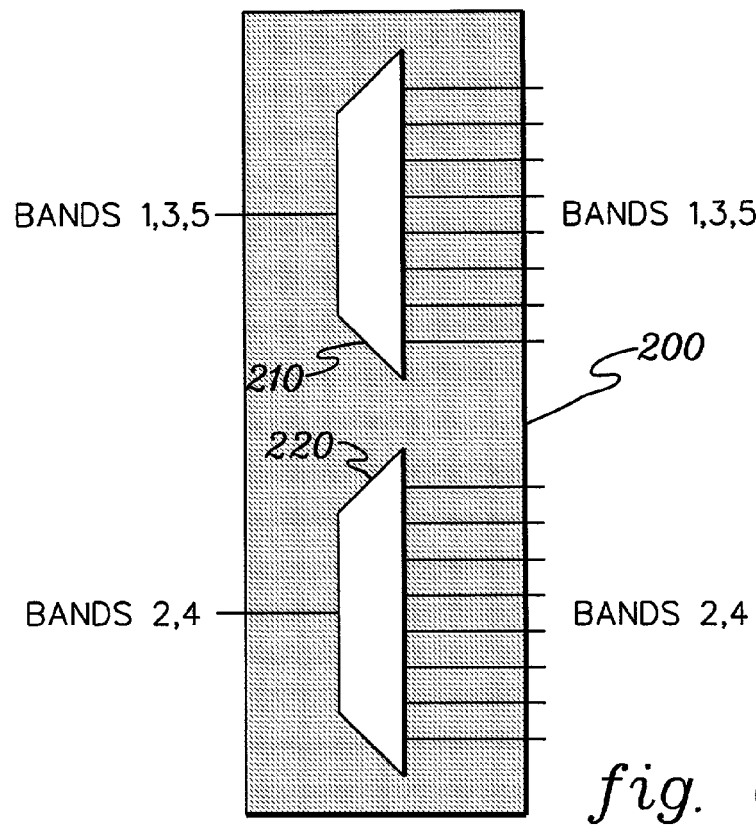
FIG. 6a is a functional schematic of one exemplary dual-AWG multi-band demultiplexer of the present invention, each demultiplexer handling its own group of alternating wavelength bands.

The schematic view of FIG. 6a depicts a single-die implementation of a dual-AWG multi-band demultiplexer of the present invention. Die 200 contains first (210) and second (220) AWG demultiplexers, each with its FSR tuned to about twice the bandwidth of each band (e.g., 16 channels, using the 8-channel band examples of FIGS. 5a–b). Demultiplexer 210 therefore operates with a periodicity of 2 bands, and handles the odd bands 1, 3 and 5; and demultiplexer 220 also operates with the same 2 band periodicity, but handles the even bands 2 and 4. The wider FSR addresses the roll-off penalty discussed above with reference to FIG. 4. By widening the band over which the AWG is periodic, a more linear (i.e., flatter) response can be obtained across an individual band, which is preferably centered in the most linear portion of the AWG. In one example, the roll-off is decreased from the 2 dB value of FIG. 4 to about 0.5 dB using this approach. The even/odd feature of an AWG is also chosen by slightly adjusting the path lengths of the array waveguides.

The invention extends to single die approaches, or multi-die approaches with the separate grating elements included in the same component package.

Figure 6B:
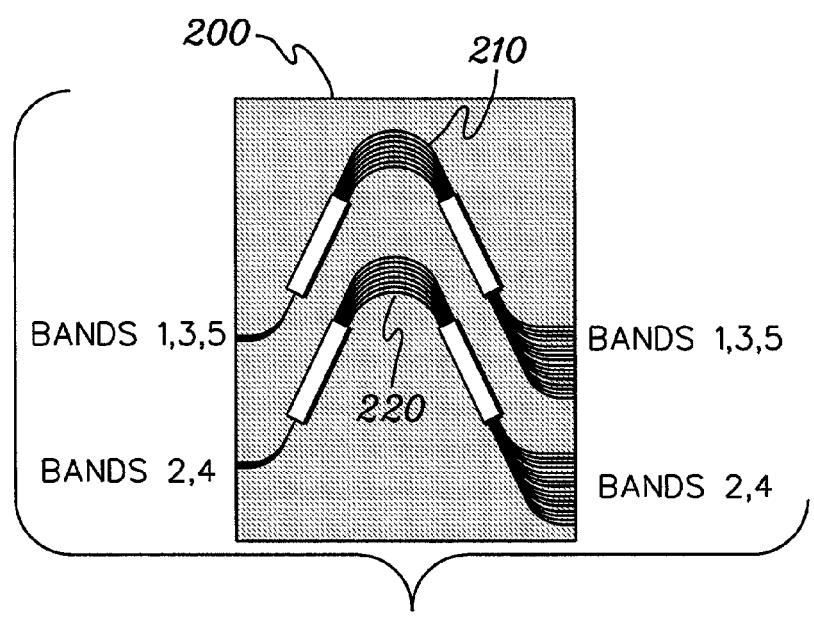

FIG. 6b shows an exemplary layout of a dual-AWG die in accordance with the present invention. The appropriate design parameters are used for each respective AWG, including appropriate input/output points along the input and output facets of their planar waveguides. The proper even/odd inputs and outputs are then designated as in FIG. 6b (and therefore must be considered to properly connect this device into a system).

This dual-AWG device provides a single inventory part number, regardless of its band of operation. As discussed above, the roll-off effects are compensated by using two wider band AWGs, at the modest expense of requiring connection to the proper device inputs and outputs in a system.

Figure 7:
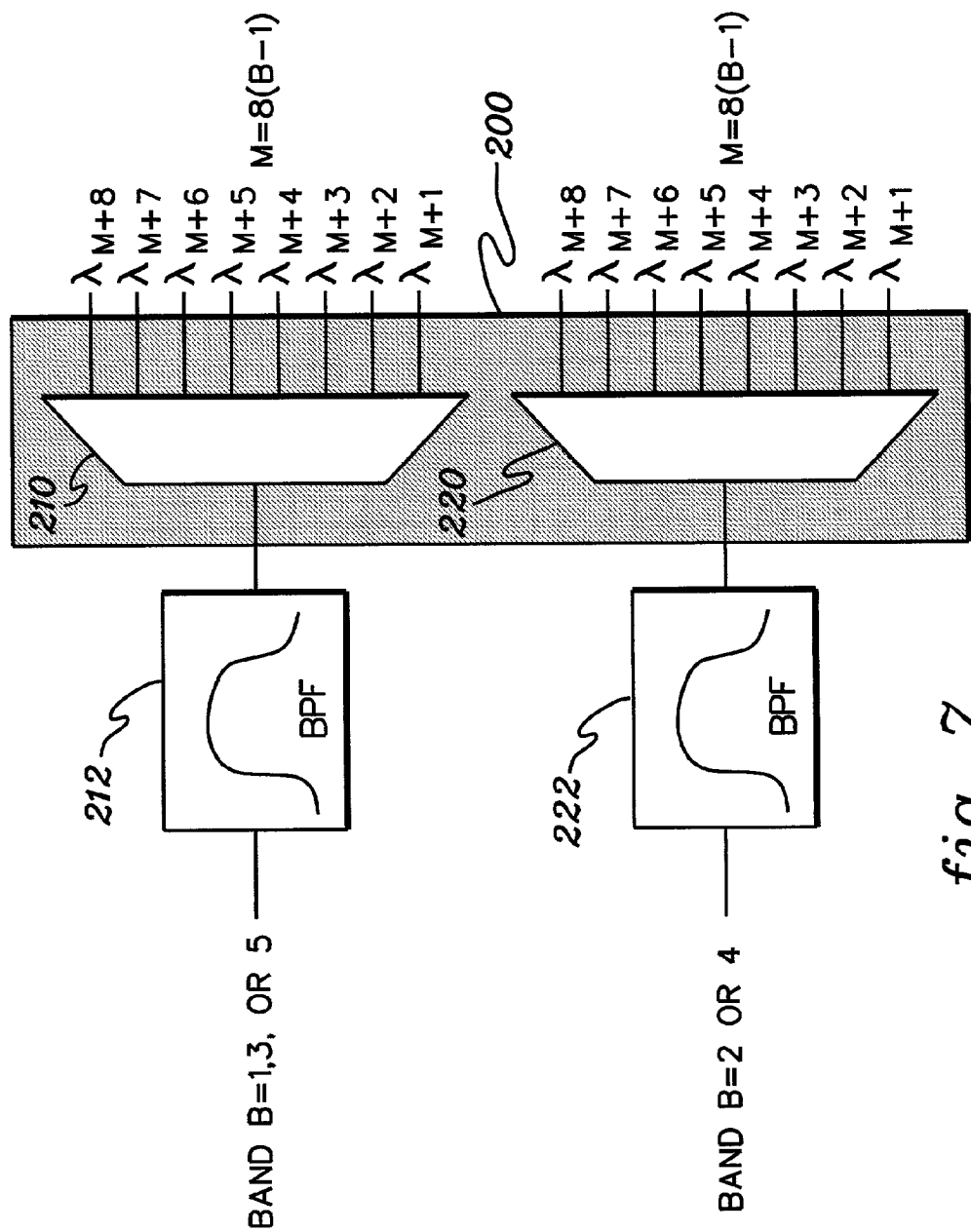
FIG. 7 is a functional schematic of another exemplary dual-AWG multi-band demultiplexer of the present invention, including optional input band-pass filters (for the band of interest)

In fact, as shown in FIG. 7, system designers may desire to implement external, input band-pass-filters 212, 222 depending on the band of interest, to improve optical performance. Other band-specific devices can also be placed in-line. However, as discussed above, regardless of the band, the same multi-band demultiplexer device 200 can be employed—as long as the proper even/odd band inputs and output are connected, requiring only the a-priori knowledge of which band is required. This benefit is reflected in the generalized output labeling in FIG. 7, where the output channels are dependent only on the input band variable "B."

Figure 8:
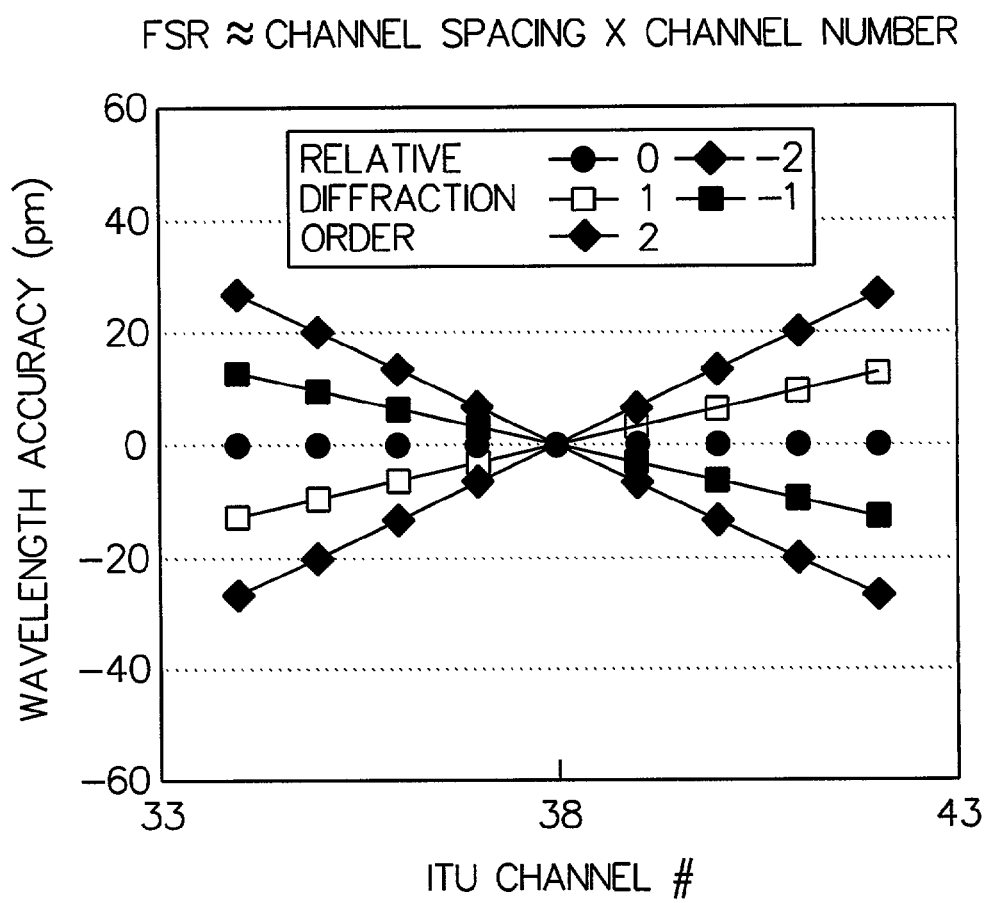
FIG. 8 is a graph showing the wavelength accuracy depending on diffraction order (i.e., determined by chosen AWG input/output)

Another issue arising with multi-band operation is wavelength accuracy at the device outputs. An AWG's operation is dependent on its diffraction order, which itself is dependent on the input wavelength. For example, with reference to FIG. 8, assuming the same input and output points are used regardless of the band of operation, the differing diffraction orders may result in output wavelength inaccuracies of up to +/−30 pm at the extreme outer channels in a single band of interest.

To address this issue, and in accordance with another aspect of the present invention, multiple input points are provided along the input planar array (25 in FIG. 1b), and multiple sets of output points (possibly overlapping) are provided along the output planar array (27 in FIG. 1b). Optical waveguides are routed to/from these input/output "points" along these planar array facets, becoming the actual device inputs and outputs.

The proper inputs and outputs are then connected in a system based the operational band of interest. This approach sets the diffraction order of the array waveguides to minimize output wavelength inaccuracies for the band of interest. This approach requires the a-priori knowledge of which band the device is targeted for, and proper connection, but this is often known during system design for a static system.

Figure 9:
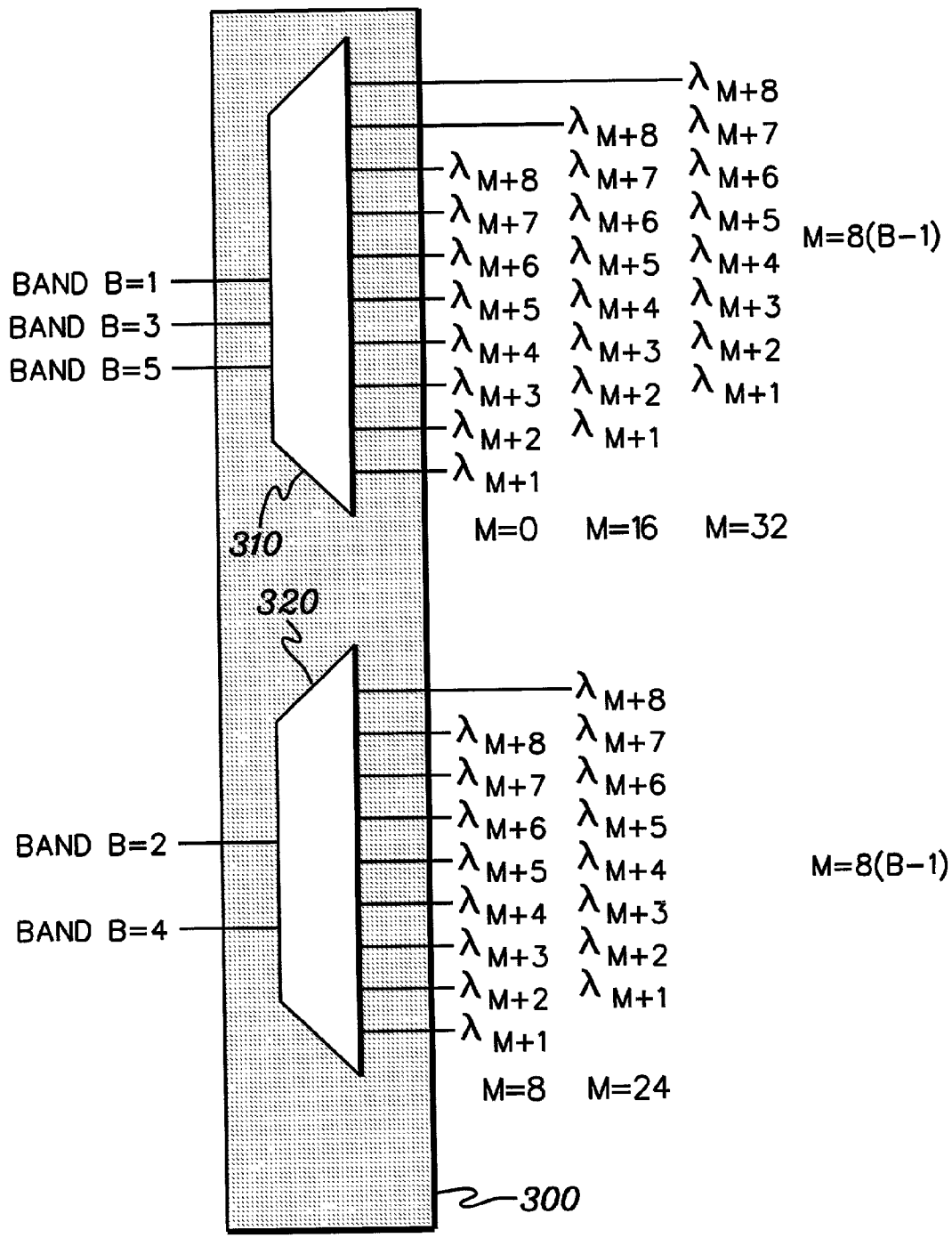
FIG. 9 is a functional schematic of another exemplary dual-AWG multi-band demultiplexer of the present invention wherein inputs and outputs are assigned depending on the band of operation, to maximize wavelength accuracy.

This approach is shown schematically in FIG. 9. As above, a single die 300 contains two demultiplexers 310 and 320 for handling respective even and odd groups of bands, each with a free spectral range of approximately twice the bandwidth of a single band, thus offering the same roll-off minimization benefits discussed above. Each demultiplexer has separate inputs, and separate sets of outputs (possibly overlapping), for each respective band of interest, to minimize wavelength inaccuracies within each band.

The device of FIG. 9 therefore offers the roll-off minimization, wavelength accuracy improvement, in a single package for all bands, i.e., providing the benefit of a single inventory part number for all bands.

The above-discussed connection requirements according to the band of interest are not a problem for static systems where the band is determined during hardware system design and never changed. However, other systems may require dynamic switching of the same demultiplexer between multiple bands, during operation.

Figure 10:
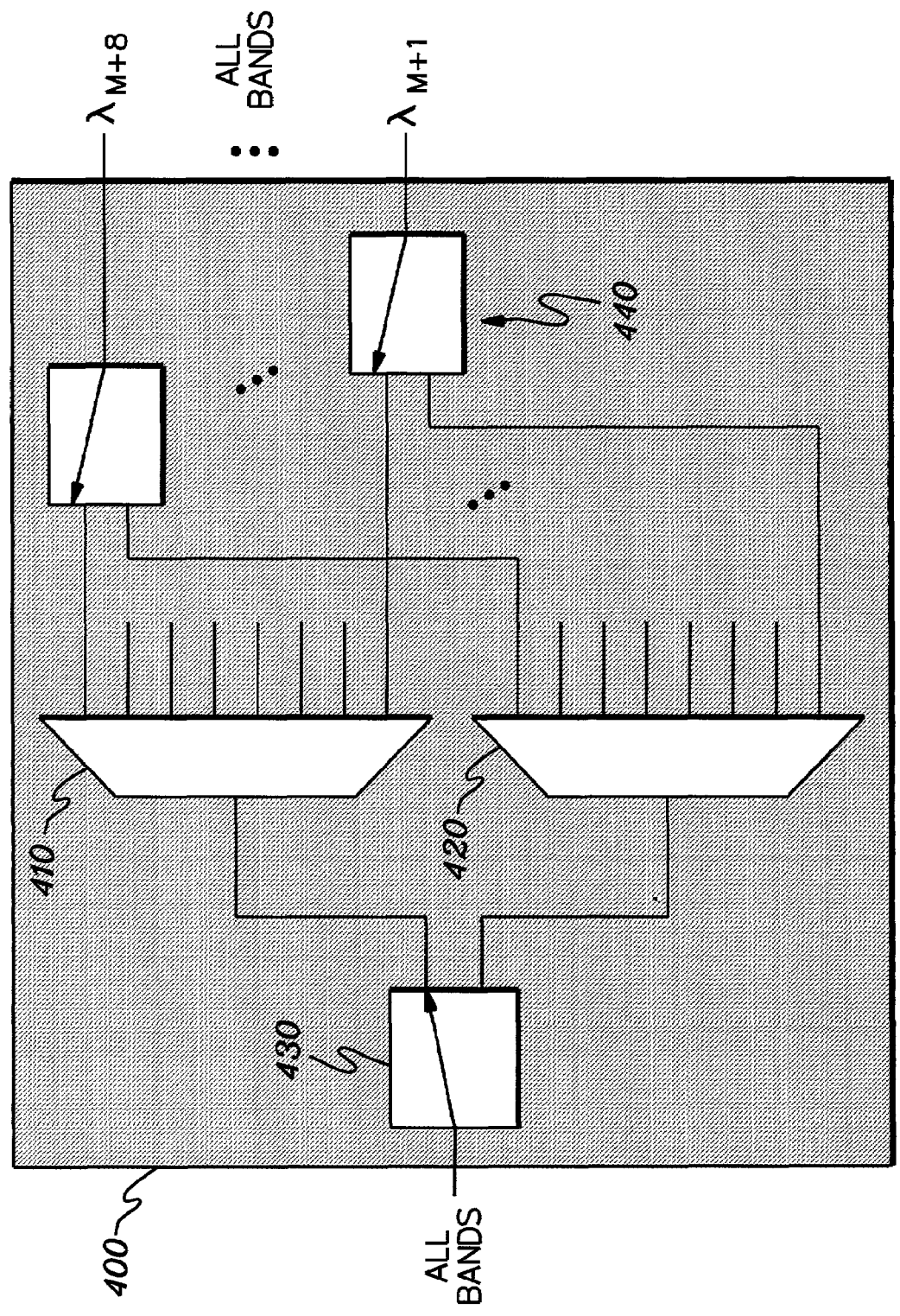
FIG. 10 is a functional schematic of another exemplary dual-AWG multi-band demultiplexer of the present invention, including input and output switches to rout the proper band to the proper AWG.

In accordance with another aspect of the present invention, and with reference to FIG. 10, a switchable dual-AWG multi-band demultiplexer is provided. A single die 400 contains two demultiplexers 410 and 420 for handling respective even and odd groups of bands, each with a free spectral range of approximately twice the bandwidth of a single band, thus offering the same roll-off minimization benefits discussed above. To accommodate dynamic reconfiguration of this device to operate at any band (even or odd), a changeable optical 1:2 switch 430 is provided to switch the device input to either AWG 410 or 420; and a bank of 2:1 switches is provided to select either the outputs of AWG 410 or of AWG 420. The switches can be implemented using known wafer-baser, planar techniques, such as micro-electro-mechanical (MEM), thermo-optic Mach-Zehnder interferometers, etc. Such switches can be controlled via control leads (not shown) which apply the appropriate control stimulus, to implement the proper optical path. (Alternatively, non-controllable power splitters can be used, but with the 50% loss penalty.)

This approach provides the added benefit of generalizing the inputs and outputs, i.e., no a-priori knowledge of the band of interest is needed during device connection, rather the inputs and outputs accommodate all bands, with dynamic switching between AWGs 410 and 420 during operation using a control stimulus.

A more complex switch network (of the general type shown in FIG. 10) can be used to selectively switch to/from every independent grating input and output of FIG. 9, providing the wavelength accuracy benefits of that approach.

Figure 11:
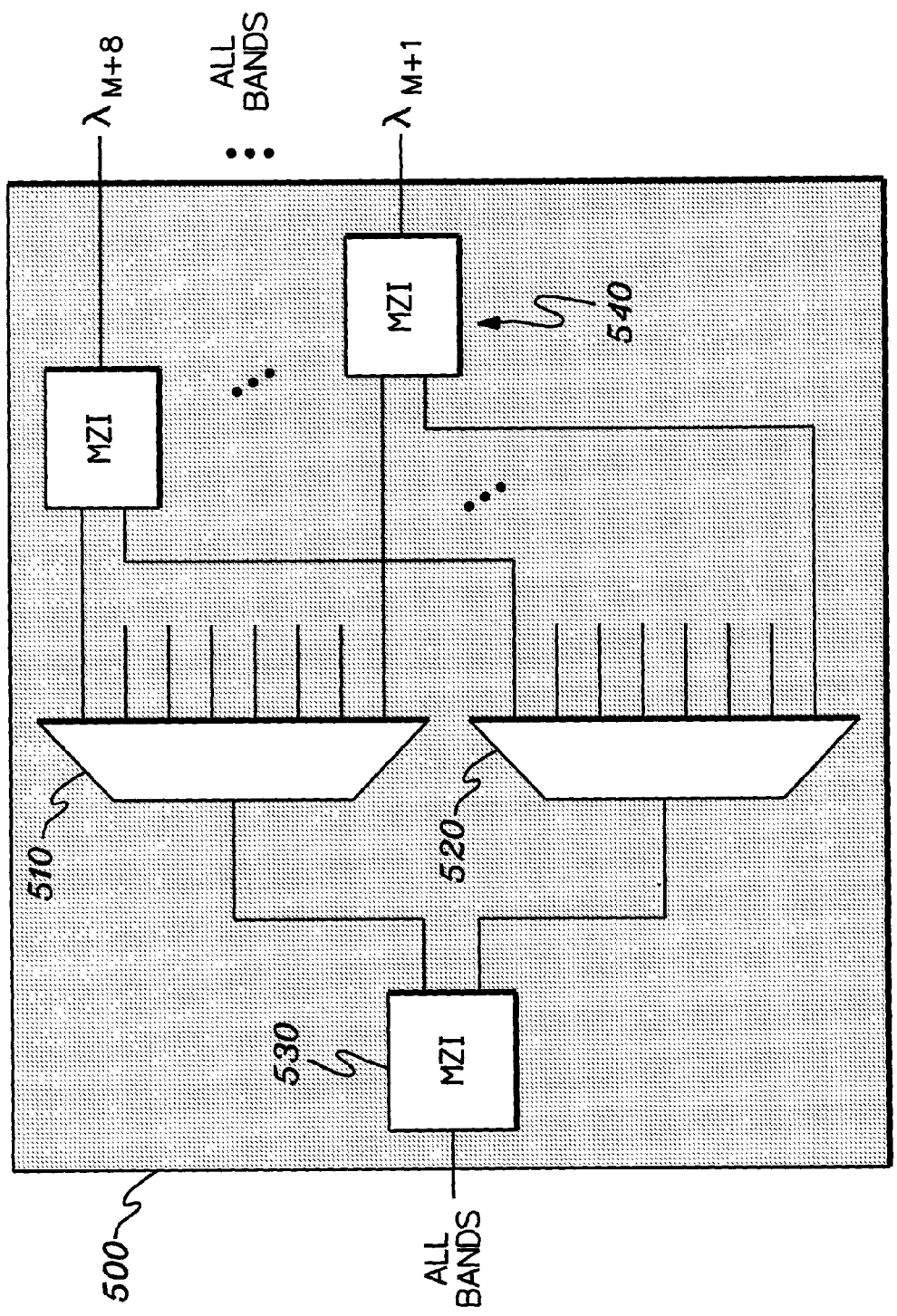
FIG. 11 is a functional schematic of another exemplary dual-AWG multi-band demultiplexer of the present invention, including input and output interleavers having appropriate periodic passband responses at their AWG connection nodes.

Yet another aspect of the present invention involves the use of periodic, but passive interleavers (e.g., Mach-Zehnder) at the input and output nodes of the device, thus removing the requirement of an operational control stimulus to operate the switches of FIG. 10. With reference to FIG. 11, as above, a single die 500 contains two demultiplexers 510 and 520 for handling respective even and odd groups of bands, each with a free spectral range of approximately twice the bandwidth of a single band, thus offering the same roll-off minimization benefits discussed above. Because of the periodic nature of each AWG, a first interleaver 530 can be used at the device input. As known to those skilled in the art, this interleaver can be used to implement a periodic bandpass filter at each of its output nodes, with all odd bands appearing at a first output (directed toward the odd band AWG 510), and all even bands appearing at a second output (directed toward the even band AWG 520). The inverse of this function is performed by the bank of output interleavers 540, each having a first input from AWG 510, and a second input from AWG 520. A signal at either input is transmitted to the composite output. Because only a single band is assumed to be handled by device 500, there will be no band interference at either the input or output interleavers.

This approach provides a single device input, and a single set of device outputs, all generalized across all bands, and eliminates the need for an independent switch control mechanism as in FIG. 10, but maintains its multi-band and roll-off characteristics.

The disclosed multi-band AWG devices operate within any band of a predetermined number of bands, thus providing the distinct advantage of device transparency to band of interest. This reduces the need to stock specially designed components for each band. The present invention also addresses the roll-off and accuracy problems normally associated with periodic AWGs, by providing separate AWGs for separate groups of bands, each with a wider free spectral range (FSR) to reduce roll-off in outer channels, and (optionally) designated inputs per band for static systems, providing greater wavelength accuracy. Dynamic switching and band interleaving are disclosed, which also provide greater device flexibility.

The principles of the present invention extend to any AWG architectures and methods for their fabrication, including those disclosed in the above-incorporated U.S. Patent Application entitled "Compact, Low Insertion Loss, High Yield Arrayed Waveguide Grating." That unique, compact AWG has features such as:

Optimal widths and spacing of waveguides (especially the array and output waveguides) along the planar waveguide region facets, which are largely determinative of AWG size and optical performance;

Optimal waveguide cross-section (e.g., width and height) for optical performance and alignment to fiber cores;

Modified index of refraction difference (0.78) between the waveguide core and cladding regions, as an independent variable to ensure proper optical energy confinement and therefore optical performance; and Optimal array waveguide numbers, lengths, path length differences, and free spectral range for the wavelength bands and band spacings of interest.

Any of the principles of those disclosed AWGs can be used to implement the multi-band devices disclosed herein, in accordance with the present invention; as can any other type of grating element such as echelle gratings. And though the "demultiplexer" application is discussed in detail above, those skilled in the art will recognize that these principles extend to the complementary multiplexer application, or any application where banded wavelength operation is required. And though the exemplary even/odd approach is disclosed here, the invention extends easily to alternating bands of higher integer multiples, such as every third, fourth, etc., with the number of grating elements increasing accordingly if operation across the entire range so divided is required.

Moreover, the present invention can be combined with advanced fiber array attachment, passivation and packaging techniques disclosed in the above-incorporated U.S. Patent Applications entitled "Redundant Package for Optical Components;" "Waveguide Stress Engineering and Compatible Passivation in Planar Lightwave Circuits;" "High Thermal Efficiency, Small Form-Factor Packages Including Thermally Insulative Cavities, and Transfer Molded Variants;" and "Precision Fiber Optic Alignment and Attachment Apparatus."

While the invention has been particularly shown and described with reference to preferred embodiment(s) thereof, it will be understood by those skilled in the art that various changes in form and details may be made therein without departing from the spirit and scope of the invention.

What is claimed is:

1. A planar lightwave circuit for demultiplexing an optical signal that contains a plurality of consecutive odd and even numbered bands of information channels within a prescribed range of wavelengths, a respective odd numbered band of information channels containing a plurality of sequentially contiguous information channel wavelengths extending from a lower information channel wavelength of said respective odd numbered band to an upper information channel wavelength of said respective odd numbered band, and a respective even numbered band of information channels being comprised of a plurality of sequentially contiguous information channel wavelengths extending from a lower information channel wavelength of said respective even numbered band to an upper information channel wavelength of said respective even numbered band, and wherein an information channel wavelength within any band is not encompassed by the wavelength bandwidth of any other band, and wherein consecutive odd numbered bands are separated from one another by an even numbered band therebetween, and consecutive even numbered bands are separated from one another by an odd numbered band therebetween, said planar lightwave circuit comprising:

a first, odd numbered band-associated periodic grating element, which is selectively coupled to receive any odd numbered band and is operative to demultiplex therefrom each of the plurality of sequentially contiguous information channel wavelengths contained in said any odd numbered band applied thereto; and a second, even numbered band associated periodic grating element, which is selectively coupled to receive any even numbered band and is operative to demultiplex therefrom each of the plurality of sequentially contiguous information channel wavelengths contained in said any even numbered band applied thereto.

2. The planar lightwave circuit according to claim 1, wherein every other one of said plurality of sequentially contiguous wavelength bands has the same bandwidth.

3. The planar lightwave circuit according to claim 1, wherein each of said odd and even numbered bands has the same bandwidth.

4. The planar lightwave circuit according to claim 1, wherein said first and second periodic grating elements are selectively coupled to common inputs and/or common outputs by way of controllable optical switch elements.

5. The planar lightwave circuit according to claim 1, wherein said first and second periodic grating elements are selectively coupled to common inputs and/or common outputs by way of optical interleaver devices.

6. The planar lightwave circuit according to claim 1, wherein said first and second periodic grating elements comprise arrayed waveguide gratings or echelle gratings.

7. The planar lightwave circuit according to claim 1, wherein the free spectral range of each of said first and second periodic grating elements is on the order of twice the bandwidth of each wavelength band.

8. The planar lightwave circuit according to claim 1, wherein said first and second periodic grating elements are closely spaced on a common substrate.

9. A planar lightwave circuit for multiplexing or demultiplexing any band of multiple bands of data channels of within a wavelength range comprising:
- a first periodic grating element which is selectively coupled to receive any one band of a first group of bands of data channels and being operative to multiplex or demultiplex any of said first group of bands of data channels; and
- a second periodic grating element which is selectively coupled to receive any one band of a second group of bands of data channels and being operative to multiplex or demultiplex any of said second different group of bands of data channels;

wherein at least one band of the first group lies, in wavelength, between two, bands of the second group wherein the bands of the first group of bands of data channels are spaced apart by a predetermined wavelength value;

the bands of the second group of bands of data channels are spaced apart by the same predetermined wavelength value equivalent to the bandwidth of each band of data channels;

the first group of bands of data channels comprises alternating even bands of said multiple bands of the wavelength range;

the second group of bands comprises alternating odd bands of said multiple bands of the wavelength range;

channels demultiplexed by the first periodic grating do not overlap in wavelength with channels demultiplexed by the second periodic grating; and wherein channels demultiplexed by the first and second periodic grating are sequential channels.

* * * * *